(12) United States Patent
Nishiura et al.

(10) Patent No.: US 12,529,168 B2
(45) Date of Patent: Jan. 20, 2026

(54) CARBON NANOTUBE COMPOSITE WIRE AND MANUFACTURING METHOD THEREFOR

(71) Applicant: YAZAKI CORPORATION, Tokyo (JP)

(72) Inventors: Ken Nishiura, Shizuoka (JP); Junichiro Tokutomi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 169 days.

(21) Appl. No.: 18/609,812

(22) Filed: Mar. 19, 2024

(65) Prior Publication Data

US 2024/0218568 A1 Jul. 4, 2024

Related U.S. Application Data

(63) Continuation of application No. PCT/JP2023/000406, filed on Jan. 11, 2023.

(30) Foreign Application Priority Data

Jan. 11, 2022 (JP) .................................. 2022-002308

(51) Int. Cl.
*D01F 9/12* (2006.01)
*C01B 32/168* (2017.01)

(52) U.S. Cl.
CPC .............. *D01F 9/12* (2013.01); *C01B 32/168* (2017.08); *D10B 2101/122* (2013.01)

(58) Field of Classification Search
CPC ... C01B 32/168; D01F 9/12; D10B 2101/122; H01B 13/00; H01B 5/14
See application file for complete search history.

(56) References Cited

U.S. PATENT DOCUMENTS

| | | | |
|---|---|---|---|
| 2013/0299212 A1 | 11/2013 | Hata et al. | |
| 2018/0233247 A1 | 8/2018 | Uchida et al. | |

FOREIGN PATENT DOCUMENTS

| | | |
|---|---|---|
| JP | 2005-48206 A | 2/2005 |
| JP | 2006-147170 A | 6/2006 |
| JP | 5896422 B2 | 3/2016 |
| JP | 2018-133163 A | 8/2018 |
| WO | 2005/091345 A1 | 9/2005 |

*Primary Examiner* — Arti Singh-Pandey
(74) *Attorney, Agent, or Firm* — Sughrue Mion, PLLC

(57) ABSTRACT

Provided is a carbon nanotube composite wire including: a substrate; a carbon nanotube; and a thin metal film formed on the carbon nanotubes, wherein the carbon nanotube has a peak ratio (G/D) of a G band to a D band in a Raman spectrum of 5 or more and 30 or less, a carbon nanotube occupied area ratio that is a ratio of a cross-sectional area of the carbon nanotube to a sum of the cross-sectional area of the carbon nanotube and a cross-sectional area of the thin metal film is 10% or less in the cross section perpendicular to the longitudinal direction, and an amorphous layer made from a metal oxide is present at an interface between the carbon nanotube and the thin metal film, and a thickness of the amorphous layer is within a range of 1 nm or more and 5 nm or less.

6 Claims, 4 Drawing Sheets

CARBON NANOTUBE COMPOSITE WIRE AND MANUFACTURING METHOD THEREFOR

CROSS-REFERENCE TO RELATED APPLICATIONS

The present application is a continuation of International Application No. PCT/JP2023/000406, filed on Jan. 11, 2023, and based upon and claims the benefit of priority from Japanese Patent Application No. 2022-002308, filed on Jan. 11, 2022, the entire contents of which are incorporated herein by reference.

TECHNICAL FIELD

The present application relates to a carbon nanotube composite wire and a method for manufacturing the carbon nanotube composite wire.

BACKGROUND

In order to reduce the size and power consumption of electronic equipment, it is required to reduce the resistance of wiring materials and increase the allowable current density. Since a carbon nanotube (CNT) is lightweight and highly conductive, it is expected to be used as a composite wire combining a CNT and a metal.

As the CNT composite wire, for example, Japanese Patent No. 5896422 proposes a CNT metal composite material including a CNT assembly in which a metal is deposited on the surface of a CNT being blended. Further described is that in the CNT metal composite material, the metal has the volume content of 20 or more and 70 or less, and the minimum volume resistivity of the CNT metal composite material is $1.8 \times 10^{-5}$ Ω·cm.

SUMMARY OF THE INVENTION

However, the CNT metal composite material described in Japanese Patent No. 5896422 does not provide higher conductivity than that of the wiring using only conventional metal materials. In addition, since the CNT is more expensive than metal, a high CNT volume content as described in Japanese Patent No. 5896422 results in high cost. Furthermore, in the plating method described in Japanese Patent No. 5896422, when a CNT is immersed in an electrolytic solution such as an acid, the properties of the CNT itself may change, such as a decrease in the intensity ratio of the G band to the D band (G/D ratio), which is a measure of the crystallinity of the CNT, and as a result, the conductive properties of the composite may decrease.

An object of the present application is to provide a CNT composite wire having higher conductivity than that of conventional metal materials while reducing the amount of the CNT in the CNT composite wire, and a method for manufacturing the CNT composite wire.

A carbon nanotube composite wire according to an aspect of the present application includes a substrate, a carbon nanotube, and a thin metal film formed on the carbon nanotubes, wherein the carbon nanotube has a peak ratio (G/D) of a G band to a D band in a Raman spectrum of 5 or more and 30 or less, and a carbon nanotube occupied area ratio that is a ratio of a cross-sectional area of the carbon nanotube to a sum of the cross-sectional area of the carbon nanotube and a cross-sectional area of the thin metal film is 10% or less.

A method for manufacturing a carbon nanotube composite wire according to an aspect of the present application includes (a) a step of spreading a carbon nanotube dispersion on a substrate, (b) a step of forming the thin metal film on the carbon nanotube after step (a), (c) a step of specifying a position of the carbon nanotube on the thin metal film after step (b), (d) a step of forming a mask on the thin metal film after step (c) and then removing through etching a part not protected by the mask, and (e) a step of performing heat treatment in a reducing atmosphere after step (d).

The present application provides a CNT composite wire having higher conductivity than that of conventional metal materials while reducing the amount of the CNT in the CNT composite wire, and a method for manufacturing the CNT composite wire.

DETAILED DESCRIPTION OF THE INVENTION

Figure 1:
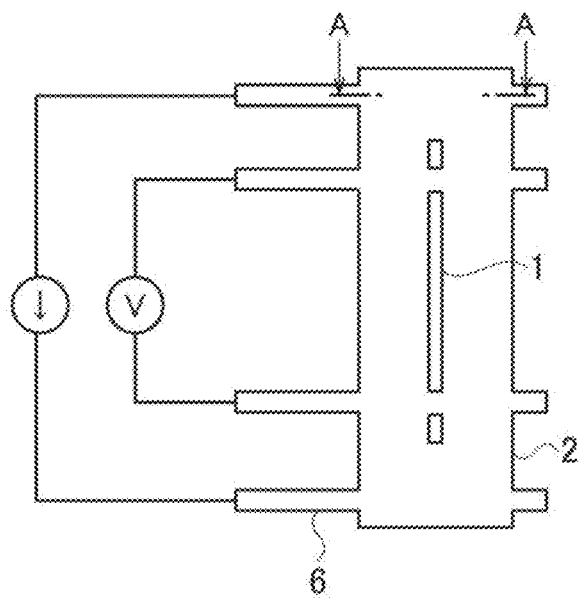
FIG. 1 is a schematic diagram illustrating a CNT composite wire and electrodes for electrical properties evaluation.

Referring to the drawings, a detailed description is given below of a CNT composite wire and a method for manufacturing the CNT composite wire according to the present embodiment.

Figure 2:
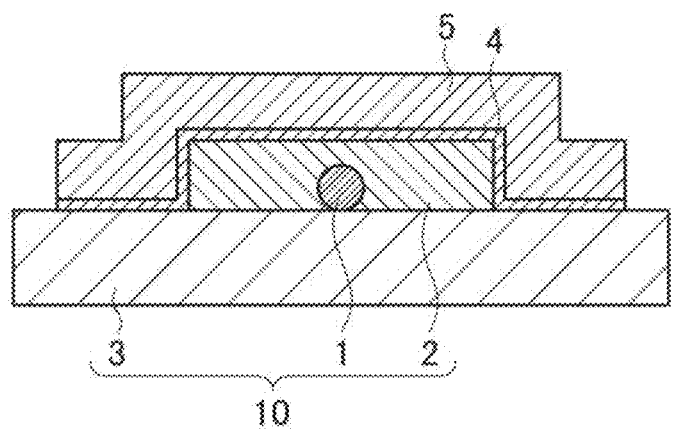
FIG. 2 is a cross-sectional view of the CNT composite wire illustrated in FIG. 1 along the line A-A.

A CNT composite wire 10 according to the present embodiment includes a CNT 1 disposed on a substrate 3 and a thin metal film 2 formed on the CNT 1. In FIGS. 1 and 2, metal films 4 and 5 are formed on the thin metal film 2 as an electrode 6 for evaluating the electrical properties of the CNT composite wire 10.

A known CNT can be used as the CNT 1 making up the CNT composite wire 10. The CNT 1 may be a single-walled nanotube (SWNT) having a single wall, a double-walled carbon nanotube (DWCNT), or multi-walled nanotube (MWNT) having multiple walls, and a MWNT having three or more walls is preferable from the aspect of conductivity. The diameter of the CNT is preferably within a range of 0.4 and 50 nm, and the average length of the CNT 1 is preferably 10 µm or more. Note that the diameter and average length of the CNT 1 is measured using a known method such as electron microscopy.

The CNT 1 making up the CNT composite wire 10 forms a conductive path that conducts electricity in the longitudinal direction of the CNT composite wire 10. Thus, the CNT 1 is oriented along the longitudinal direction (conductive direction) of the CNT composite wire 10. Note that since the CNT composite wire 10 according to the present embodiment is manufactured using a semiconductor process, the orientation state of the CNT 1 can be optionally controlled.

In the CNT composite wire 10, the conductive path is manufactured using one or more CNTs 1. In addition, one or more CNTs may be present in an extended state or aggregate to form a mass to make up the CNT 1. Furthermore, the terminal part of the CNT 1 may be in an open state or a closed state.

When the CNT 1 is measured using Raman spectroscopy, characteristic peaks due to lattice vibrations appear in the Raman spectrum: D band around $1,300\ cm^{-1}$, G band around $1,590\ cm^{-1}$, and G' band around $2,700\ cm^{-1}$. The G band originates from in-plane stretching vibration of a six-membered ring structure in a graphite structure, and the D band originates from its defect structure. The intensity ratio of the G band to the D band (G/D ratio) is an index representing the level of crystallinity in the CNT 1. In the CNT 1, the G/D ratio is preferably within a range of 5 or more and 30 or less, more preferably of 12 or more and 20 or less. When the G/D ratio of the CNT 1 is 5 or more and 30 or less, the CNT surface has few defects and high crystallinity, and thus the CNT has excellent conductivity.

The CNT occupied area ratio in the CNT composite wire 10 is preferably 10% or less, more preferably within a range of 0.01% or more and 1% or less, and even more preferably of 0.01% or more and 0.1% or less. By having the CNT occupied area ratio of 10% or less, the CNT composite wire 10 having higher conductivity than that of conventional metal materials can be obtained while reducing the amount of the CNT 1 in the CNT composite wire 10. The CNT occupied area ratio indicates the ratio of the cross-sectional area of the CNT 1 to the sum of the cross-sectional area of the CNT 1 and the cross-sectional area of the thin metal film 2.

As described above, the CNT occupied area ratio in the CNT composite wire 10 is preferably 10% or less. Here, the CNT occupied area ratio is preferably the ratio of the cross-sectional area of the CNT 1 to the sum of the cross-sectional area of the CNT 1 and the cross-sectional area of the thin metal film 2 in the cross section perpendicular to the longitudinal direction of the CNT composite wire 10. In this case, since the ratio of the CNT 1 oriented along the longitudinal direction of the CNT composite wire 10 increases, it is possible to obtain the CNT composite wire 10 having higher conductivity than that of conventional metal materials while further reducing the amount of the CNT 1.

As the metal for forming the thin metal film 2, it is preferable to use a highly conductive metal, for example, at least one selected from the group consisting of copper, a copper alloy, aluminum, and an aluminum alloy. The metal for forming the thin metal film does not need to be a pure metal and may be an alloy made from two or more types of elements. The thin metal film may be a single layer film or a multilayer film made from two or more types of metals. The thickness of the thin metal film is not particularly limited and may be within a range of 30 and 100 nm, for example.

In the CNT composite wire 10, an amorphous layer made from a metal oxide preferably exists at the interface between the CNT 1 and the thin metal film 2. The thickness of the amorphous layer is preferably within a range of 1 nm or more and 5 nm or less. The presence of the amorphous layer relaxes the lattice mismatch between the thin metal film 2 and the CNT 1, and the CNT composite wire 10 having high conductivity can be obtained.

A known substrate can be used as the substrate 3 making up the CNT composite wire 10. For example, a semiconductor substrate (a silicon substrate such as $SiO_2/Si$ or a compound semiconductor substrate), a ceramic substrate, a glass substrate, and the like can be used as long as their insulation properties are guaranteed.

Known metal films can be used as the metal films 4 and 5 to be used for the electrode 6 for electrical properties evaluation of the CNT composite wire 10. As the metal films 4 and 5, it is possible to use a metal film made from at least one metal selected from the group consisting of Au, Ti, Ag, Cu, Al, Fe, Ni, Co, Cr, Mo, Nb, and W. The electrode 6 may be an alloy made from two or more types of metals described above, or a laminate made from two or more types of metals described above as illustrated in FIG. 2. The thickness of the electrode 6 is not particularly limited.

In the CNT composite wire 10 according to the present embodiment, the CNT 1 is oriented along the longitudinal direction (conductive direction) of the CNT composite wire 10 to form a conductive path. Thus, even when the CNT 1 has a low concentration, the conductive path is efficiently formed. By adding the conductive path formed by the CNT 1 to a conductive path formed by the thin metal film 2, the CNT composite wire 10 has higher conductivity than that of conventional metal materials due to the synergistic effect between the conductive path of the thin metal film 2 and the conductive path of the CNT 1.

In the CNT composite wire 10 according to the present embodiment, the presence of an amorphous layer made from a metal oxide at the interface between the CNT 1 and the thin metal film 2 relaxes the lattice mismatch between the CNT 1 and the thin metal film 2, thereby enhancing the affinity between the CNT 1 and the thin metal film 2. Thus, the conductive path is easily connected between the CNT 1 and the thin metal film 2. Consequently, the CNT composite wire 10 effectively utilizes the conductivity of the CNT 1.

As described above, the CNT composite wire 10 according to the present embodiment includes the substrate 3, the CNT 1, and the thin metal film 2 formed on the CNT 1, wherein in the CNT 1, the peak ratio (G/D) of the G band to the D band in the Raman spectrum is within a range of 5 or more and 30 or less, and the CNT occupied area ratio which is the ratio of the cross-sectional area of the CNT 1 to the sum of the cross-sectional area of the CNT 1 and the cross-sectional area of the thin metal film 2 is 10% or less. Therefore, while reducing the amount of the CNT 1 in the CNT composite wire 10, the CNT composite wire 10 has higher conductivity than that of conventional metal materials.

<Method for Manufacturing CNT Composite Wire>

A method for manufacturing the CNT composite wire according to the present embodiment includes a step of spreading a CNT dispersion on a substrate (step (a)), a step of forming a thin metal film on the CNT after step (a) (step (b)), a step of specifying the position of the CNT on the thin metal film after step (b) (step (c)), a step of forming a mask on the thin metal film after step (c) and then removing the part not protected by the mask through etching (step (d)), and a step of performing heat treatment in a reducing atmosphere after step (d) (step (e)). Each step is described below.

[Step (a)]

Figure 3A:
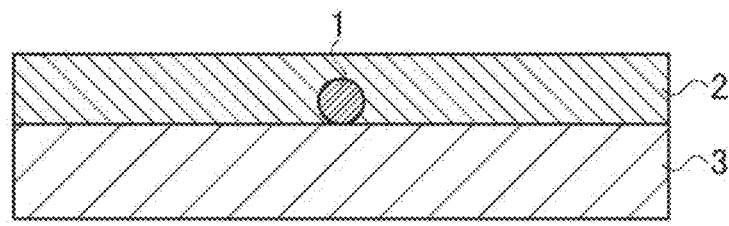
FIG. 3A is a schematic diagram for explaining a method for forming the CNT composite wire.

Step (a) is a step of spreading a CNT dispersion on the substrate 3 (FIG. 3A).

The CNT dispersion to be spread on the substrate is manufactured by highly dispersing a CNT 1 in a solvent. The solvent for dispersing the CNT 1 is not particularly limited, but it is preferable to use an organic solvent.

As the organic solvent, any one of an alcohol-based solvent, an amide-based solvent, a ketone-based solvent, and a mixed solvent made by optionally combining an alcohol-based solvent, a ketone-based solvent, and an amide-based solvent. As the alcohol-based solvent, at least one selected from the group consisting of methanol, ethanol, 1-propanol, 2-propanol, 1-butanol, 2-methyl-1-propanol, 2-butanol, and 1-methyl-2-propanol can be used. As the amide-based solvent, at least one selected from the group consisting of N,N-dimethylformamide, N-methylpyrrolidone, dimethylsulfoxide, and dimethylacetamide can be used. As the ketone-based solvent, at least one of acetone or methyl ethyl ketone can be used.

As the CNT 1, one described above can be used. In addition, the CNT 1 may be prepared by removing a metal catalyst such as platinum or amorphous carbon through washing with an acid beforehand, or may be subjected to graphitization through heating treatment beforehand. By performing such a pretreatment on the CNT 1, the CNT 1 can be highly purified or highly crystallized.

The heating temperature for graphitization is preferably within a range of 500 and 3,500° C. The heating time is determined in consideration of the heating temperature, but is preferably within a range of 10 minutes and 5 hours. The rate of temperature rise to 1,500° C. is preferably within a range of 5 and 30° C./min.

Examples of an inert gas used to create an inert gas atmosphere during heating include noble gases, such as helium gas and argon gas, and nitrogen.

In the CNT 1, defects on the CNT surface are reduced by performing heat treatment in this step, and the peak ratio (G/D ratio) of the G band to the D band, which is an index of crystallinity in the Raman spectrum, becomes 5 or more, thereby improving crystallinity.

The method for highly dispersing the CNT 1 in the solvent is not particularly limited, and the CNT 1 can be dispersed by stirring at high speed after adding the CNT 1 to the solvent. Note that in order to disperse the CNT 1 efficiently, an external force may be applied by using an ultrasonic disperser or the like after adding the CNT 1 to the solvent. By performing such a step, a CNT dispersion can be obtained in which the CNT 1 comes untied to be highly dispersed in the solvent.

The CNT dispersion obtained is dropped on the substrate 3 and spread. The method for spreading the CNT dispersion is not particularly limited, and known methods such as spin coating, casting, and dipping can be used. In addition, the CNT 1 may be cleaned through annealing after the CNT spread and before forming a thin metal film.

[Step (b)]

Step (b) is a step of forming the thin metal film 2 on the CNT 1 (FIG. 3A).

The thin metal film 2 is formed on the substrate 3 on which the CNT dispersion has been spread in step (a). As the metal for forming the thin metal film 2, a metal described above can be used. The method for forming the thin metal film 2 is not particularly limited, and may be appropriately selected according to the type and thickness of the thin film. For example, known methods such as resistance heating vacuum deposition, chemical vapor deposition (CVD), electron beam deposition, sputtering, and ion plating can be used.

A thin metal film may be formed after the CNT dispersion is spread on the substrate on which the mask has been provided. Further, the CNT may be spread on a substrate on which a thin metal film has been previously formed, and a thin metal film may be further formed thereon.

[Step (c)]

Step (c) is a step of specifying the position of the CNT 1 on the thin metal film 2 (FIG. 3A).

The position of the CNT 1 can be specified by observing using a scanning electron microscope (SEM) the substrate 3 on which the thin metal film 2 has been formed in step (b). Specifically, the position of the CNT 1 can be measured using relative coordinates based on an alignment mark previously formed on the substrate 3. Through this step (c), the orientation state of the CNT 1 in the CNT composite wire 10 can be confirmed, and can be used as a mark for specifying the position of mask formation and etching to be performed in step (d).

[Step (d)]

Figure 3B:
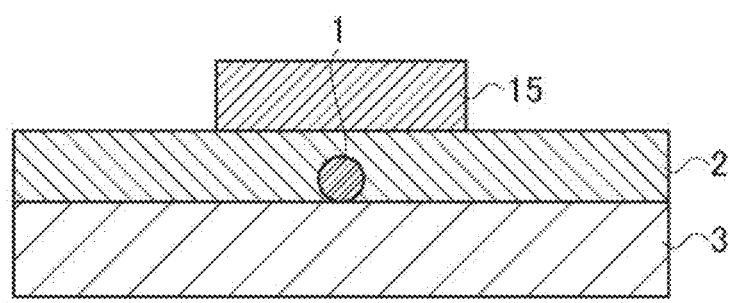
FIG. 3B is a schematic diagram for explaining the method for forming the CNT composite wire.
Figure 3C:
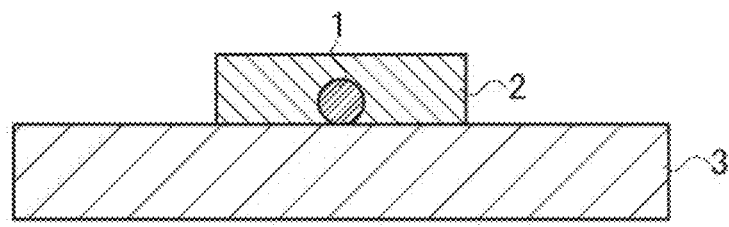
FIG. 3C is a schematic diagram for explaining the method for forming the CNT composite wire.

Step (d) is a step of forming a mask on the thin metal film 2, and then removing through etching a part not protected by the mask (FIGS. 3B and 3C).

As illustrated in FIG. 3B, patterning is performed by forming a resist layer 15 on the surface of the substrate 3 on which the thin metal film 2 has been formed, and this resist pattern is used as a mask. After developing the resist pattern, the parts not protected by the mask are selectively etched away. Then, by peeling off the resist layer 15, as illustrated in FIG. 3C, the thin metal film 2 is patterned into a predetermined shape, thereby forming conductive wiring on the substrate 3.

Methods used for patterning the thin metal film 2 include electron beam lithography in which direct drawing is performed with an electron beam, photolithography using a short-wavelength light source, and direct laser drawing. Further, the patterning of the thin metal film 2 may be performed by forming a thin metal film through a mask such as a stencil mask.

A known resist can be used. For example, a thermosetting resist or a UV curing resist is used. As the thermosetting resist, for example, an epoxy-based resist or a urethane-based resist is used.

A known method can be used as the etching method. For example, dry etching or wet etching can be used. In the case of wet etching, a mixed acid of hydrofluoric acid, nitric acid, acetic acid, phosphoric acid, sulfuric acid, and the like can be used as an etching solution, and the processing can be performed using a dip method in which dipping in the etching solution is performed or a spin etching method in which the etching solution is sprayed.

[Step (e)]

Step (e) is a step of performing heat treatment in a reducing atmosphere.

The substrate 3 on which the thin metal film 2 has been patterned in step (d) is subjected to heat treatment in an inert gas atmosphere such as argon and a reducing atmosphere such as a hydrogen atmosphere. This heat treatment allows grains to grow while removing the grain boundary oxide film formed during the formation of the thin metal film. The heating temperature and heating time during the heat treatment in a reducing atmosphere are not particularly limited.

It is possible to manufacture an electrode by forming, for example, using a vacuum deposition method, a metal film of the above electrode for electrical properties evaluation over the entire substrate obtained in step (e).

As described above, the method for manufacturing a CNT composite wire according to the present embodiment includes: (a) a step of spreading a CNT dispersion on a substrate; (b) a step of forming a thin metal film on the CNT after step (a); (c) a step of specifying the position of the CNT on the thin metal film after step (b); (d) a step of forming a mask on the thin metal film after step (c) and then removing the part not protected by the mask through etching; and (e) a step of performing heat treatment in a reducing atmosphere after step (d). Therefore, in the manufacturing method according to the present embodiment, it is possible to provide a CNT composite wire having higher conductivity than that of conventional metal materials while reducing the amount of the CNT in the CNT composite wire.

EXAMPLES

The present embodiment will be described in more detail below using examples, but the present embodiment is not limited to these examples.

Example 1

For the CNT, MWNT (manufactured by TAIYO NIPPON SANSO CORPORATION, S grade product) was used. The initial G/D ratio was within a range of 1 and 2, the average diameter was 13 nm, and the length was about 150 μm.
(Spread of CNT Dispersion <Step (a)>)
A graphite crucible with enclosed powdered CNT was placed in a heating furnace (SCC-220 manufactured by KURATA GIKEN). The furnace was kept under reduced pressure of 10 Pa for 30 minutes, and the residual gas in the crucible and the adsorbed gas on the CNT surface were deaerated (deaeration step). Next, the electricity supply to the heater was started, and the temperature was raised at a rate of 20° C./min (warming step). When the temperature in the furnace reached 2,200° C., argon gas (99.9999% purity) was enclosed so as to achieve a gauge pressure of +40 kPa. Furthermore, when the temperature in the furnace reached the maximum temperature of 2,800° C., the temperature was kept constant (holding step). After the passage of 2 to 12 hours, the electricity supply to the heater was stopped and the inside of the furnace was gradually cooled.

Figure 4:
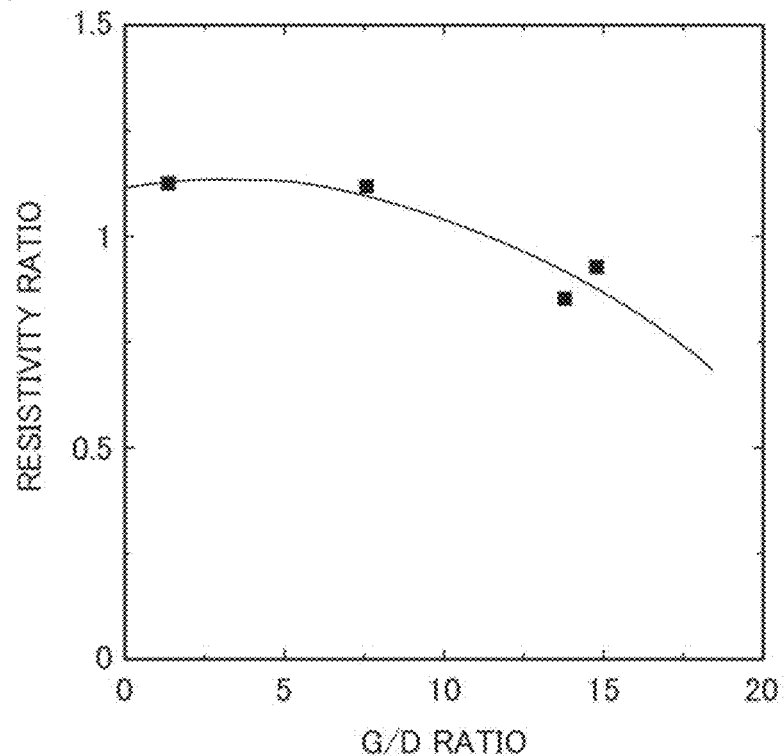
FIG. 4 is a diagram illustrating a relationship between the ratio of the resistivity of the CNT composite wire and that of wiring using only aluminum, and the G/D ratio of the CNT.
Figure 5:
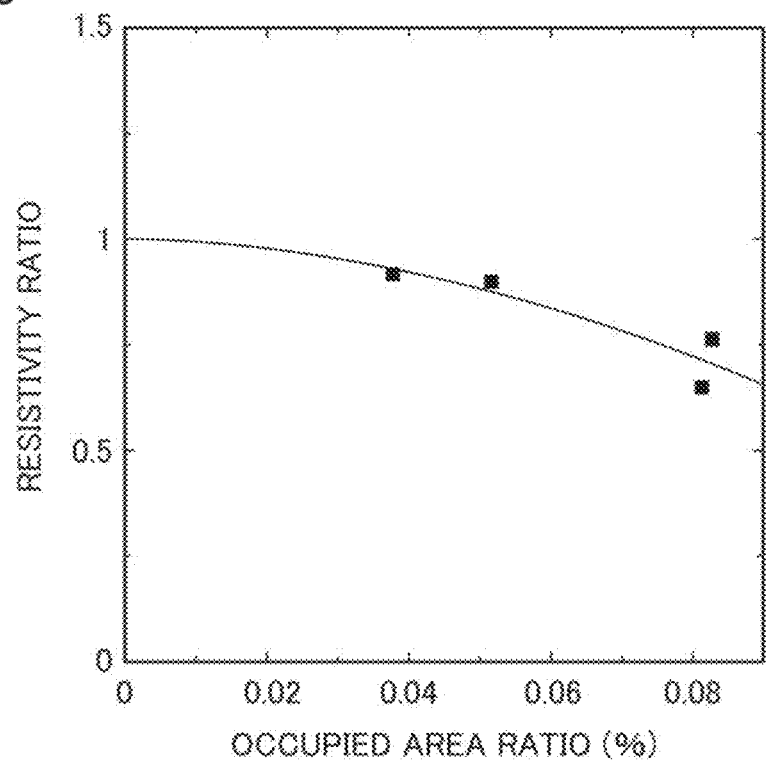
FIG. 5 is a diagram illustrating a relationship between the ratio of the resistivity of the CNT composite wire and that of the wiring using only aluminum, and the CNT occupied area ratio.

The CNT dispersion was manufactured by dipping the heat-treated CNT in 2-propanol and dispersing it for 30 minutes using an ultrasonic disperser (PR-1 manufactured by THINKY CORPORATION). The CNT concentration in the dispersion was $1 \times 10^{-5}$% by mass. The dispersion was dropped onto a $SiO_2$/Si substrate and spin-coated at 1,000 rpm.
(Thin Metal Film Formation (Step (b)))
A thin aluminum film having a thickness of 50 nm was deposited using an electron beam evaporation method with a vacuum evaporator (VT-43N manufactured by CANON ANELVA CORPORATION) on the substrate on which the CNT dispersion was spread. Pure aluminum pellets having a purity of 99.9% or more were used as the deposition source, and the deposition rate was set to about 2 Å/s and the deposition was performed.
(Positioning of CNT (Step (c)))
After the position of the CNT was specified using a scanning electron microscope (SEM) (MERLIN manufactured by Carl Zeiss Co., Ltd.), the position of the CNT was measured using relative coordinates based on an alignment mark preformed on the substrate.
(Mask Formation, Etching <Step (d)>)
A negative electron beam lithography resist (OEBR-CAN40 manufactured by TOKYO OHKA KOGYO CO., LTD.) was applied at 3,000 rpm on the surface of the substrate on which the thin aluminum film was formed, and prebaked at 110° C. for 1 minute. Next, an electron beam was irradiated with a dose of 25 $\mu C/cm^2$ using an electron beam lithography system (F7000S manufactured by ADVANTEST CORPORATION), and baking (PEB) was performed after exposure at 110° C. for 1 minute. Next, the resist pattern was developed through immersion in a developer (NMD-3W manufactured by TOKYO OHKA KOGYO CO., LTD.) for 50 seconds. After the development, immersion in a mixed acid aluminum etching solution (thin metal film KANTO CHEMICAL CO., INC.) was performed for 1 to 2 minutes at room temperature, the aluminum pattern was etched, and the resist pattern was peeled off through immersion in a stripping solution 104 (manufactured by TOKYO OHKA KOGYO CO., LTD.) for 20 minutes at 60° C.
(Heat Treatment in Reducing Atmosphere <Step (e)>)
$H_2$ annealing was performed in a 3.2% by volume $H_2$/Ar forming gas at 350° C. for 60 minutes to allow grain growth while removing the grain boundary oxide film formed during aluminum deposition. Thus, the CNT composite wire according to the present embodiment was obtained.
(Formation of Electrode for Electrical Properties Evaluation)
A positive resist (ZEP-520A manufactured by Zeon Corporation) was applied at 6,000 rpm to the surface of the substrate on which the thin aluminum film was formed, and an electron beam was irradiated with a dose of 100 $\mu C/cm^2$ using an electron beam lithography system. Then, the pattern was formed through immersion in a developer (ZED-N50 manufactured by Zeon Corporation) and a rinse (ZMD-B manufactured by Zeon Corporation) at room temperature, respectively. Subsequently, a thin titanium film (metal film 4 in FIG. 2) was formed at 5 nm and a thin gold film (metal film 5 in FIG. 2) was formed at 50 nm through vacuum evaporation, and then an electrode was formed through immersion in a stripping solution (ZDMAC manufactured by Zeon Corporation) at 60° C. for 20 minutes.
[Evaluation Method]
The sample of example 1 was evaluated using the following method. The results are shown in FIGS. 4 to 6.
(Pattern Confirmation)
The pattern shape of the formed aluminum/CNT local composite was evaluated using a scanning electron microscope (SEM) (MERLIN manufactured by Carl Zeiss Co., Ltd.). The thickness of the thin aluminum film was also evaluated using a scanning probe microscope (SPM) (AFM5000 manufactured by Hitachi High-Tech Corporation) with a dynamic force mode.
(Electrical Properties Evaluation)
The electrical properties were evaluated through electrical resistance measurement using a four-terminal method. Specifically, as illustrated in FIG. 1, a sample of example 1 in which four electrodes for electrical properties evaluation were formed was arranged, a constant current was passed between the two outer probes, and the electrical resistance was measured by measuring the potential difference between the two inner probes. A vacuum prober (CPX-4K manufactured by TOYO Corporation) was used as the measuring device.
(CNT Occupied Area Ratio, Metal-CNT Interface Evaluation)

The CNT occupied area ratio and the aluminum-CNT interface state in the CNT composite wire were evaluated by observing the cross section of the CNT composite wire using a transmission electron microscope (TEM) (JEM-2100F manufactured by JEOL Ltd.). Specifically, the sample was sliced to 100 nm or less using a focused ion beam system (FIB) (manufactured by FEI Company Japan Ltd.), and then observed using a TEM. The acceleration voltage at the time of observation was 200 kV, and a TEM and a scanning transmission electron microscope (STEM) were used as the observation modes.

Figure 6A:
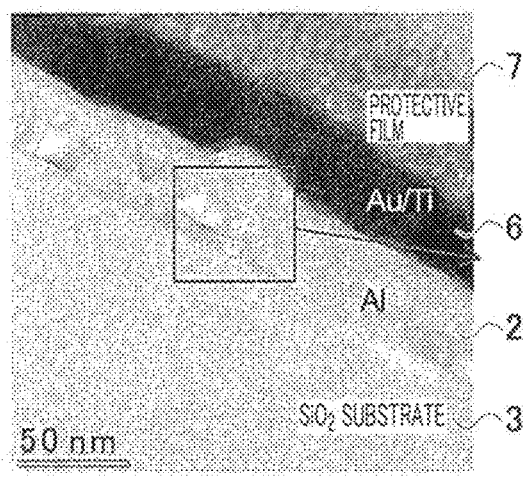
FIG. 6A is a transmission electron microscope (TEM) photograph of a cross-section of the CNT composite wire.
Figure 6B:
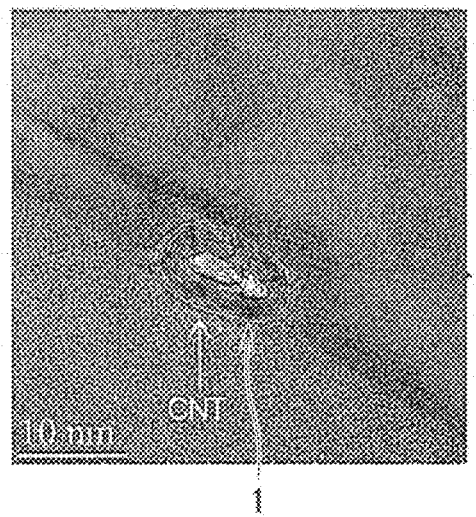
FIG. 6B is a transmission electron microscope (TEM) photograph of a cross-section of the CNT composite wire.
Figure 6C:
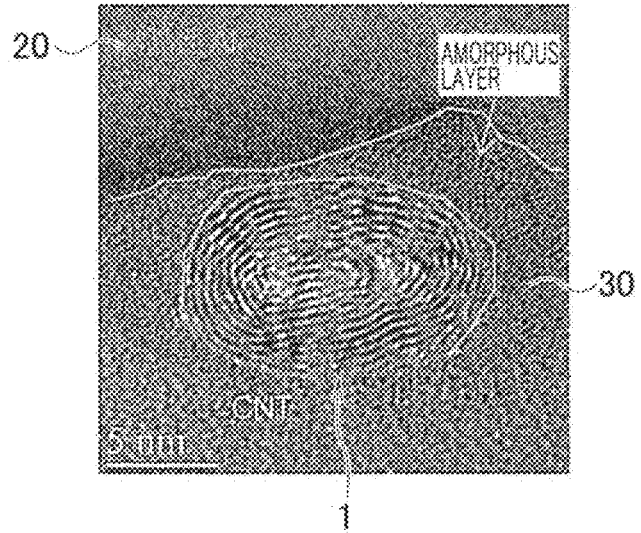
FIG. 6C is a transmission electron microscope (TEM) photograph of a cross-section of the CNT composite wire.

FIGS. 6A to 6C illustrate photographs of cross sections of the CNT composite wire, illustrating the CNT 1, the substrate 3, the thin metal film (aluminum) 2, the electrode (gold/titanium) 6, the protective film 7, the crystalline aluminum 20, and an amorphous layer 30, respectively. For the CNT occupied area ratio in the CNT composite wire, the ratio of the cross-sectional area of the CNT 1 to the sum of the cross-sectional area of the CNT 1 and the cross-sectional area of the thin metal film 2 was calculated on the basis of the obtained photographs.

FIG. 4 illustrates the relationship between the ratio of the resistivity (resistivity ratio) of the CNT composite wire and the resistivity of the wiring using only aluminum (aluminum wiring), and the G/D ratio of the CNT included in the CNT composite wire. When the resistivity ratio is less than 1, the resistivity of the CNT composite wire was lower than that of the aluminum wiring, indicating that the CNT composite wire was more conductive than the aluminum wiring. As illustrated in FIG. 4, it is evident that when the G/D ratio was less than 12, the resistivity of the CNT composite wire was higher than that of the aluminum wiring, and when the G/D ratio was 12 or more, the resistivity of the CNT composite wire was lower than that of the aluminum wiring. Therefore, it is evident that when the G/D ratio was 12 or more, the CNT composite wire had higher conductivity than that of the aluminum wiring, and the resistivity of the CNT composite wire was reduced by 10% or more compared to that of the aluminum wiring.

FIG. 5 illustrates the relationship between the ratio of the resistivity of the CNT composite wire and that of the aluminum wiring (resistivity ratio) and the CNT occupied area ratio in the CNT composite wire. It is evident that the resistivity ratio decreases as the CNT occupied area ratio increases. As illustrated in FIG. 5, it is evident that even when the CNT occupied area ratio is 0.1% or less, the CNT composite wire has higher conductivity than that of the aluminum wiring because the resistivity ratio is less than 1, and the resistivity of the CNT composite wire is reduced by 10% or more compared to the aluminum wiring.

Here, it is known that the mean free path of the CNT becomes longer as the crystallinity is higher, and the mean free path of the CNT having sufficiently high crystallinity is longer than that of aluminum. Therefore, as illustrated in the results of FIGS. 4 and 5, it is thought that the presence of the CNT having high crystallinity in aluminum increases the apparent mean free path as composite wire and decreases the resistivity.

The aluminum-CNT interface state was then evaluated using FIGS. 6A to 6C. As illustrated in FIGS. 6A to 6C, it is evident that the CNT 1 having a diameter of about 10 nm exists in the thin metal film (aluminum) 2. In FIG. 6C, the photograph with the highest magnification, it can be confirmed that the amorphous layer 30 having a diameter of about several nm exists at the interface between the crystalline aluminum 20 and the CNT 1. The amorphous layer 30 is made from a metal oxide (aluminum oxide), and it is thought that the lattice mismatch between the thin metal film (aluminum) 2 and the CNT 1 is relaxed by the amorphous layer 30, thereby obtaining high conductivity.

Although the present embodiment has been described with reference to the above examples, the present embodiment is not limited thereto, and various modifications are possible within the scope of the gist according to the present embodiment.

The entire contents of Japanese Patent Application No. 2022-002308 (filed on: Jan. 11, 2022) are incorporated by reference herein.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A carbon nanotube composite wire, comprising:
   a substrate;
   a carbon nanotube; and
   a thin metal film formed on the carbon nanotube, wherein the carbon nanotube has a peak ratio (G/D) of a G band to a D band in a Raman spectrum of 5 or more and 30 or less,
   a carbon nanotube occupied area ratio that is a ratio of a cross-sectional area of the carbon nanotube to a sum of the cross-sectional area of the carbon nanotube and a cross-sectional area of the thin metal film is 10% or less in the cross section perpendicular to the longitudinal direction of the carbon nanotube composite wire, and
   an amorphous layer made from a metal oxide is present at an interface between the carbon nanotube and the thin metal film, and a thickness of the amorphous layer is within a range of 1 nm or more and 5 nm or less.

2. The carbon nanotube composite wire according to claim 1, wherein a metal forming the thin metal film is at least one selected from the group consisting of copper, a copper alloy, aluminum, and an aluminum alloy.

3. The carbon nanotube composite wire according to claim 1, wherein the carbon nanotube occupied area ratio is within a range of 0.01% or more and 1% or less.

4. The carbon nanotube composite wire according to claim 1, wherein the carbon nanotube occupied area ratio is within a range of 0.01% or more and 0.1% or less.

5. The carbon nanotube composite wire according to claim 1, wherein the peak ratio (G/D) of the G band to the D band in the Raman spectrum is within a range of 12 or more and 20 or less.

6. A method for manufacturing the carbon nanotube composite wire according to claim 1, the method comprising:
   (a) a step of spreading a carbon nanotube dispersion on a substrate;
   (b) a step of forming the thin metal film on the carbon nanotube after step (a);
   (c) a step of specifying a position of the carbon nanotube on the thin metal film after step (b);
   (d) a step of forming a mask on the thin metal film after step (c) and then removing through etching a part not protected by the mask; and (e) a step of performing heat treatment in a reducing atmosphere after step (d).

* * * * *